United States Patent [19]
Darbo

[11] 3,892,222
[45] July 1, 1975

[54] FOLDING COMBINED BROILER, OVEN AND STOVE

[76] Inventor: Rolf E. Darbo, P.O. Box 2158, Madison, Wis. 53701

[22] Filed: July 5, 1974

[21] Appl. No.: 486,064

[52] U.S. Cl................. 126/9 R; 126/25 R; 126/29; 126/275
[51] Int. Cl.². .... F24C 1/16; A47J 37/01; F24B 3/00
[58] Field of Search.......... 126/9 R, 29, 25 R, 25 A, 126/275; 99/339, 340; 220/7

[56] References Cited
UNITED STATES PATENTS

| | | | |
|---|---|---|---|
| 1,458,409 | 6/1923 | Higham | 126/9 R |
| 2,140,924 | 12/1938 | Sather, Jr. | 126/9 R |
| 2,917,039 | 12/1959 | Sheedlo | 126/9 R |
| 2,985,164 | 5/1961 | Imoto | 126/25 R |
| 3,179,104 | 4/1965 | Chapman et al. | 126/9 R |

Primary Examiner—William F. O'Dea
Assistant Examiner—Harold Joyce
Attorney, Agent, or Firm—Darbo, Robertson & Vandenburgh

[57] ABSTRACT

A meat broiler is especially designed to use crumpled paper, e.g. newspaper, for fuel. The large assembled unit folds to a compact one-inch thick, package. It may also be used for frying and boiling food and may be converted to an oven.

8 Claims, 9 Drawing Figures

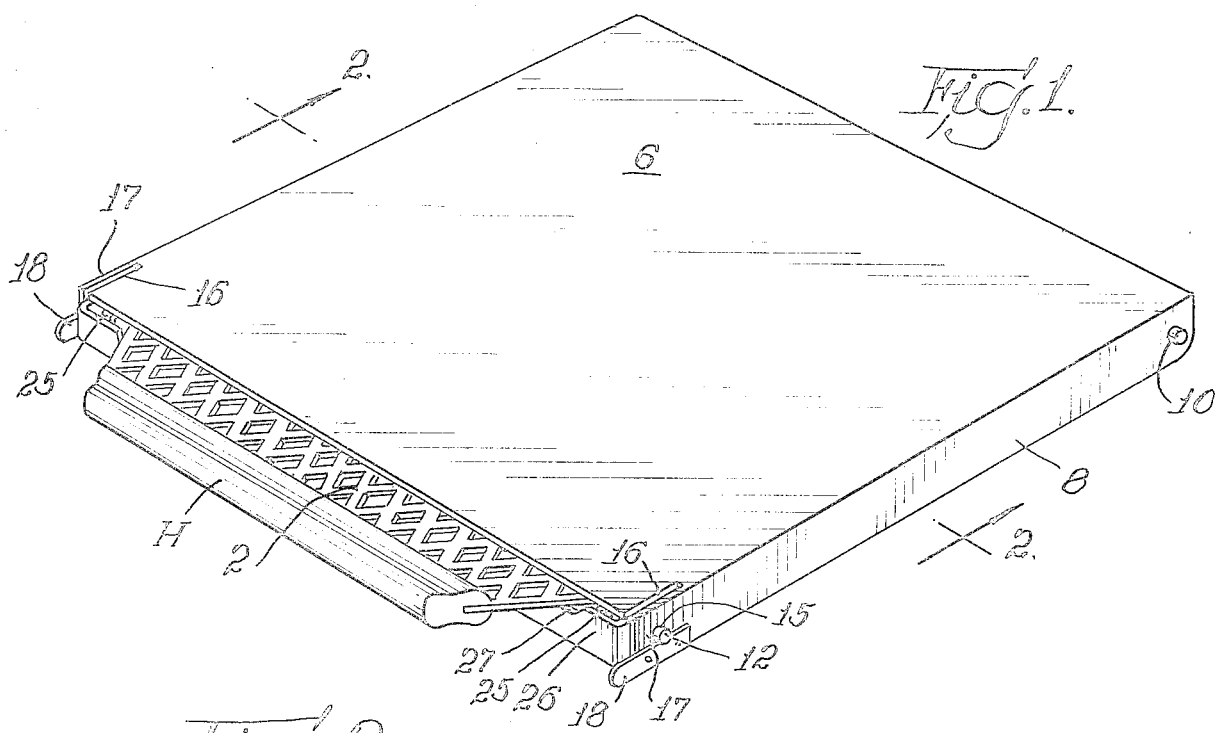
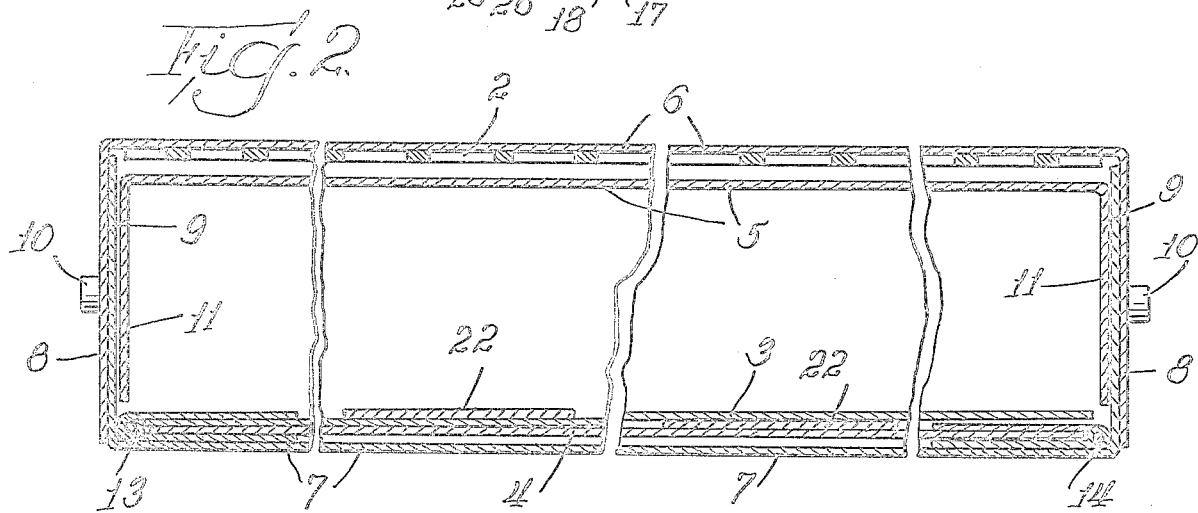
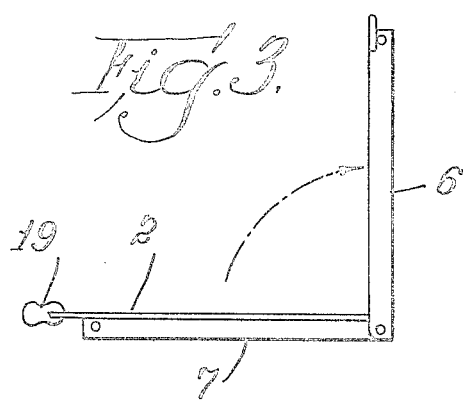
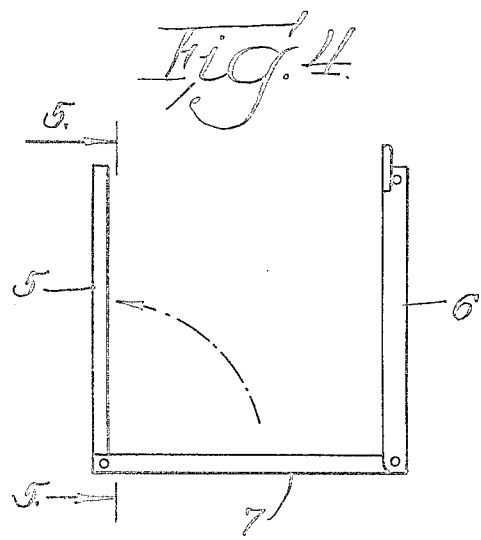

PATENTED JUL 1 1975

3,892,222

SHEET 2

FOLDING COMBINED BROILER, OVEN AND STOVE

BACKGROUND AND SUMMARY OF THE INVENTION

A wide variety of styles and sizes of charcoal-fueled meat broilers are available on the market. While crumpled newspaper is frequently used to start wood and sometimes charcoal fires, it has not been used to any great extent as the sole fuel for broiling or otherwise cooking food.

Apparatus for burning crumpled paper to supply heat for cooking must necessarily have a relatively spacious firebox so that the air necessary for combustion can be supplied to keep the paper burning continuously. Such a large broiler presents a storage problem and a space problem if the unit is to be carried to a picnic grounds or a campsite.

The principal object of the invention is to provide a meat broiler which uses crumpled newspaper as the sole fuel and which may be folded for storage or transportation into a very compact unit. A further object is to provide such a unit which includes a grille having a handle by which the grille may be moved from and to the broiler and in which the grille handle also serves as the handle for carrying the folded unit.

A further object is to provide such a broiler unit which may also be used to fry, boil or otherwise cook foods and which may be converted to an oven.

DESCRIPTION OF THE DRAWINGS

In the accompanying drawings,

FIG. 1 is a perspective view of the combined broiler, oven and stove of the invention, folded for carrying or storage;

FIG. 2 is a cross-sectional view of the folded unit taken at the line 2—2 of FIG. 1;

FIGS. 3, 4 and 5 are side views illustrating the steps to be followed in assembling the unit for use, FIG. 5 being a cross-sectional view taken at the line 5—5 of FIG. 4;

DESCRIPTION OF SPECIFIC EMBODIMENT

Figure 6:
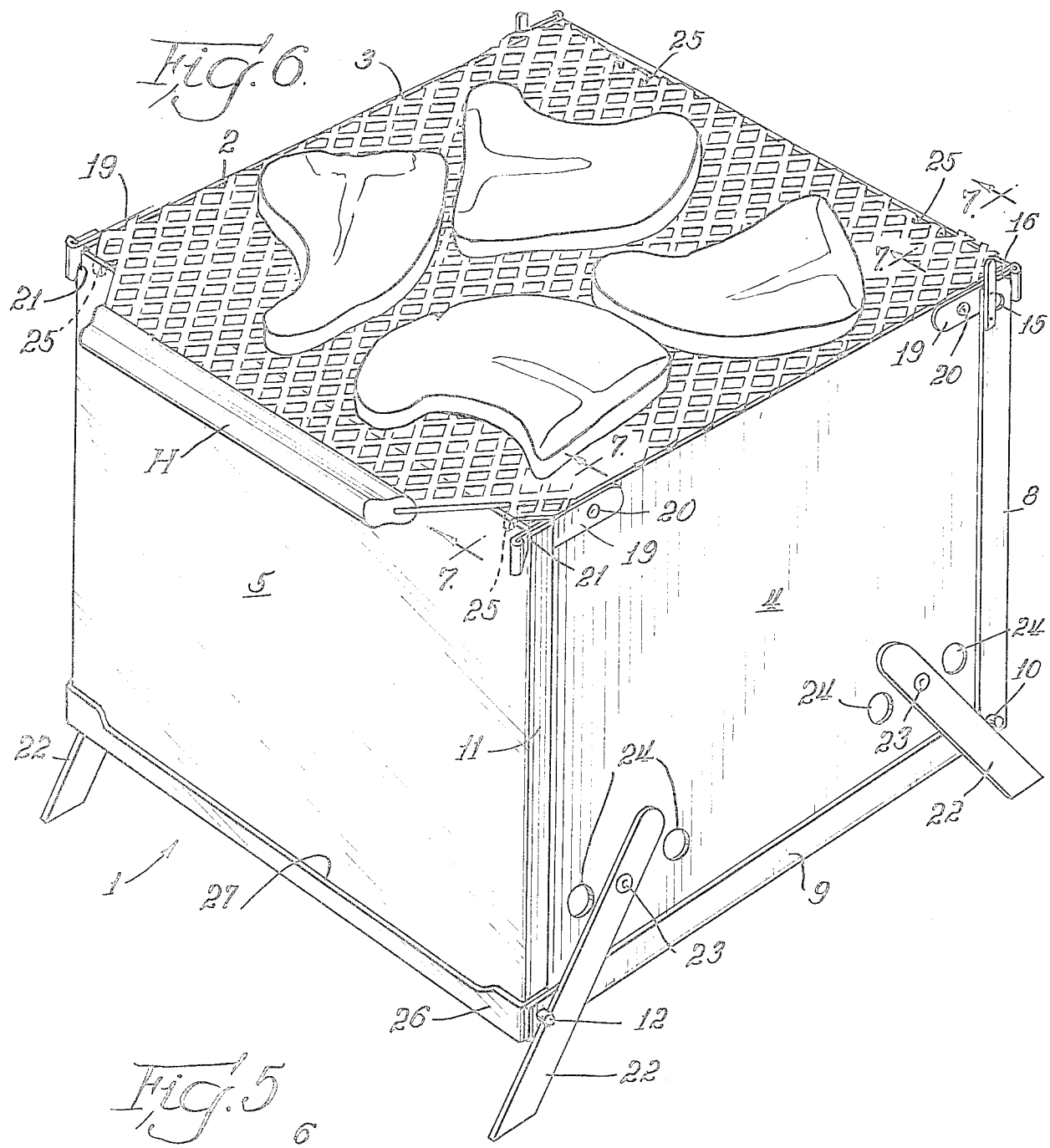
FIG. 6 is a perspective view of the assembled broiler.

As is seen in FIG. 6, the assembled broiler comprises a relatively large, generally cubical firebox 1 having an open top which is covered by a removable grille 2. The firebox is formed by side walls 3 and 4 and front and rear walls 5 and 6, respectively. All four walls are pivotally mounted to the floor 7 of the broiler to provide the desired foldability. Rear wall 6, which is provided with side flanges 8 for stiffness and strength, is pivoted by the side flanges to the rear ends of side flanges 9 of the floor by means of pins 10. Front wall 5 is also provided with side flanges 11 and is pivoted to floor flanges 9 by means of pins 12. Side walls 3 and 4 are hinged to floor 9 by means of hinges 13 and 14, respectively.

Rear wall 6 of the broiler also serves as the cover of the folded unit. It is locked in closed position by pins 12 which extend through holes 15 provided in flanges 8. Slots 16, the principal purpose of which will be described hereinafter, provide leaf spring flexibility to the end portions 17 of flanges 8 to permit the end portions to be sprung outwardly sufficiently to pass over the ends of pins 12. The withdrawal of these end portions of flanges 8 from the pins 12 to unlock the cover of the folded unit is facilitated by short handles 18.

Figure 5:
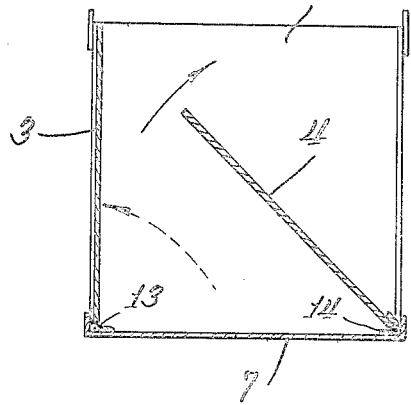

When the cover formed by rear wall 6 is disengaged from pins 12 and pivoted upwardly around pivot pins 10, as indicated in FIG. 3, grille 2 is uncovered and released and can be lifted out by means of handle H. The front wall 5 may then be lifted up, pivoting about pins 12, as indicated in FIG. 4, to upright position. Side walls 3 and 4 may then be successively lifted to upright position, pivoting about their respective hinges, as indicated in FIG. 5. The four walls are then locked together at the four corners of the firebox by latches 19 which are pivotally fastened to the side walls by rivets 20. The four latches slide into and seat in slots 16 and 21 at the tops of the rear and front walls.

The assembled unit is supported by four legs 22 which are pivotally fastened to side walls 3 and 4 respectively, by rivets 23 so that the legs may be turned until they respectively engage pins 10 and 12 which serve as stops. The legs serve to prevent damage to lawn or other surface upon which the unit rests. Holes 24 permit the flow of draft air into the firebox to support combustion of the crumpled newspaper.

Figure 7:
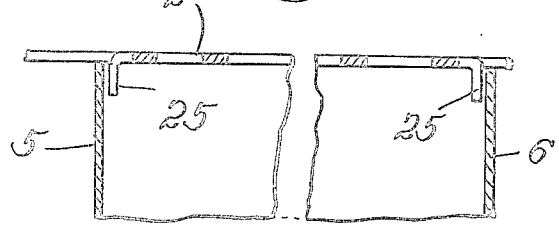
FIG. 7 is a detail view, in section, taken at the lines 7—7 of FIG. 6.

As is best seen in FIGS. 6 and 7, grille 2 rests upon the top edges of the walls of the firebox. Portions of the front and rear extremities of the grille are turned down, as at 25, to position the grille at its proper location spanning the open top of the firebox.

To use the assembled unit as a broiler or stove, four, for example, double sheets of newspaper are crumpled separately into fairly tight balls and placed loosely in the firebox. When the paper has been lighted, the grille is placed in position on top of the firebox. If the unit is to be used for broiling steak, for example, the meat should be arranged evenly upon the grille. A normal one-inch thick steak should be broiled about four minutes on each side for a medium rare broil. Thicker steaks will require a somewhat longer time. Three crumpled balls of paper will usually suffice to cook hamburgers and hot dogs, allowing about two minutes on each side.

If the initial charge of crumpled newspaper provides a fire which is insufficient to complete the cooking of the meat, additional balls of crumpled paper may be added as needed to maintain a continuously burning fire.

To fold the unit for storage or carrying, the grille is first removed and legs 22 are pivoted to retracted position. Latches 19 are disengaged so that sides 3 and 4 may be sequentially lowered upon their respective hinges to lie flat upon floor 7. Front wall 5 is then pivoted inwardly and the grille is placed upon it with the turned down portions 25 at the front of the grille arranged inside of flange 26. As can be seen in FIGS. 1 and 6, a broad notch 27 is cut out along the top edge of flange 26 to accommodate the thickness of grille 2. Then, when rear wall 6 is pivoted downwardly upon the grille and latched to pins 12, the grille is held captive and handle H may be used for carrying the folded unit.

Figure 8:
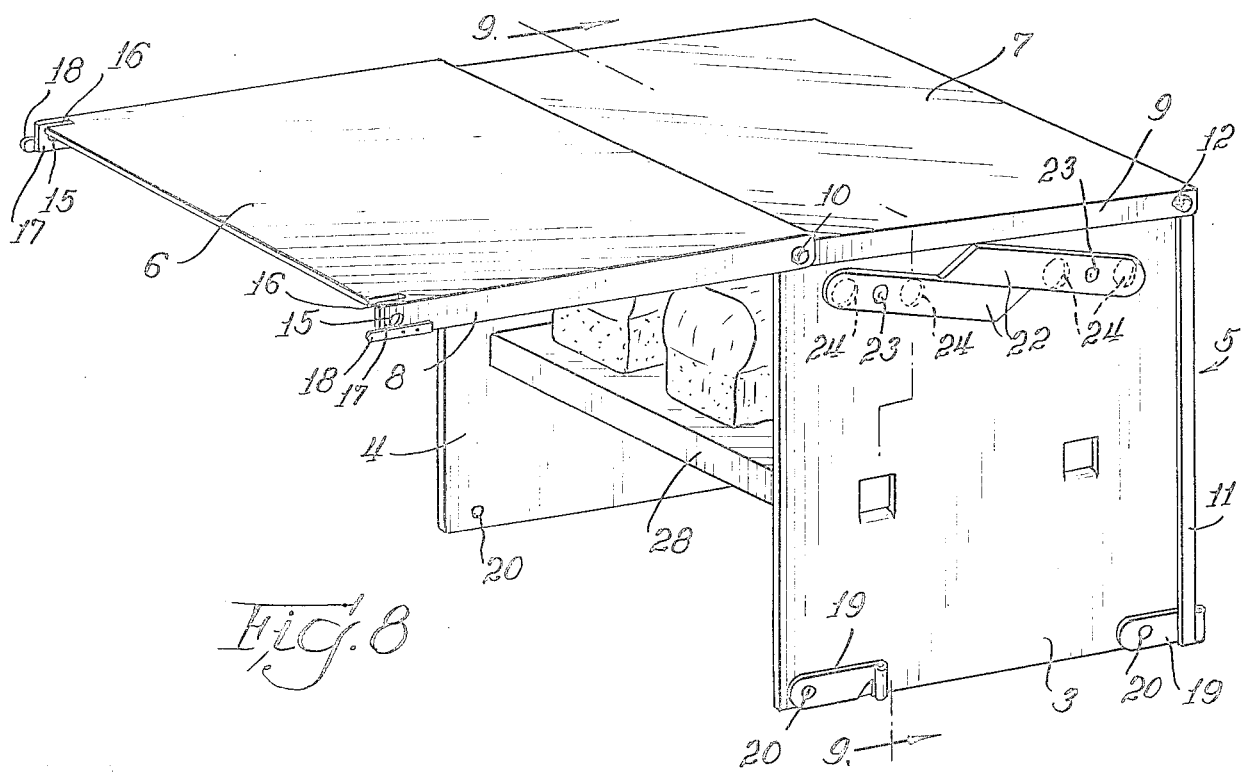
FIG. 8 is a perspective view of the unit as set up to form an oven.
Figure 9:
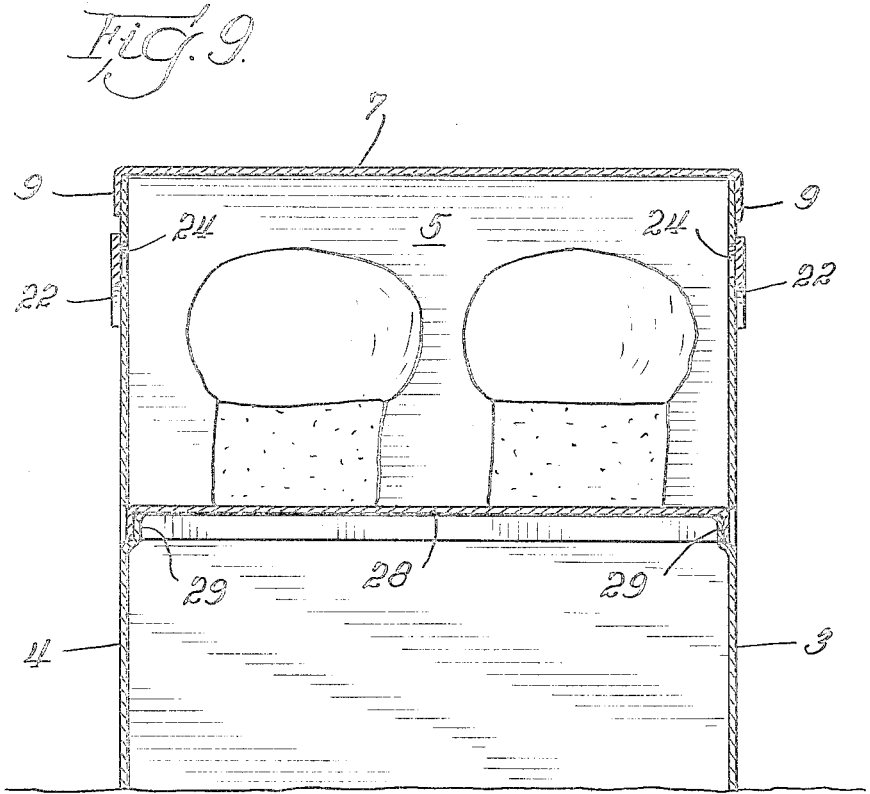
FIG. 9 is a cross-sectional view taken at the line 9—9 of FIG. 8.

In FIGS. 8 and 9, the broiler is shown converted to an oven. The assembled broiler unit is turned upside down and a shelf 28 is mounted in brackets 29 which may be provided in side walls 3 and 4 of the unit. Draft holes 24 may be covered by legs 22 and wall 6 forms the oven door. Any available and suitable fuel may be used to provide the heat for the oven, such as campfire coals or alcohol, or the oven may be placed upon the burner of a camp stove.

I claim:

1. A folding combined broiler, oven and stove comprising a firebox composed of front, rear and side walls and a floor extending over the area enclosed by said walls, a grille covering the otherwise open top of said firebox, said side walls being respectively hinged to said floor along opposite sides thereof whereby said side walls may be sequentially lowered about their respective hinges to lie flat superjacent said floor, said floor and said front and rear walls each having flanges along the opposite sides thereof, pivot pins pivotally mounting said front and rear walls respectively at the front and rear ends respectively of said floor flanges, the arrangement being such that said front and rear walls may be sequentially lowered about their respective pivotal mountings to lie flat superjacent said side walls when the latter are in lowered position, said pivot pins extending outwardly from the firebox, two pairs of legs pivotally mounted respectively to the side walls, the location of the pivotal mountings for said legs being such that each leg may be rotated to rest against an associated pivot pin to provide a leg extending beyond the floor of said firebox and may be rotated in the opposite direction to lie in retracted position entirely alongside the side wall to which it is mounted.

2. Structure in accordance with claim 1 and including air draft holes in the side walls near the floor thereof, the holes and the legs being so dimensioned and located that said legs when in retracted position cover said holes to prevent the passage of air therethrough when said structure is used upside down as an oven.

3. Structure in accordance with claim 2 and including brackets fixed to the side walls and a platform supported thereby to serve as a shelf when said structure is used upside down as an oven.

4. A folding combined broiler, oven and stove comprising a firebox composed of front, rear and side walls and a floor extending over the area enclosed by said walls, a grille covering the otherwise open top of said firebox, said side walls being respectively hinged to said floor along opposite sides thereof whereby said side walls may be sequentially lowered about their respective hinges to lie flat superjacent said floor, said floor and said front and rear walls each having flanges along the opposite sides thereof, pivot pins pivotally mounting said front and rear walls respectively at the front and rear ends respectively of said floor flanges, the arrangement being such that said front and rear walls may be sequentially lowered about their respective pivotal mountings to lie flat superjacent said side walls when the latter are in lowered position, said pivot pins at the front of the firebox extending outwardly therefrom and the ends of the flanges of the rear wall remote from the pivotal mounting of said rear wall being provided with holes located to receive said pivot pins when said structure is folded to lock the same in folded state.

5. Structure in accordance with claim 4 wherein the end portions of the flanges of the rear wall having the holes therein are severed from the wall structure to provide leaf spring elements which may be lifted to permit easier locking and unlocking engagement with the pivot pins.

6. Structure in accordance with claim 5 and including handle elements attached to and extending beyond the leaf spring elements to facilitate the lifting of said leaf spring elements to engage and disengage the pivot pins.

7. A folding combined broiler, oven and stove comprising a firebox composed of front, rear and side walls and a floor extending over the area enclosed by said walls, a grille covering the otherwise open top of said firebox and extending forwardly thereof, said grille having a handle of low heat conductivity secured to the forward edge thereof and stops extending downwardly therefrom just inside the said front and rear walls, said side walls being respectively hinged to said floor along opposite sides thereof, said floor and said front and rear walls each having flanges along the opposite sides thereof, pivot pins pivotally mounting said front and rear walls respectively at the front and rear ends respectively of said floor flanges, latch means for fastening together contiguous walls of the firebox at all four corners thereof, said pivot pins at the front of the firebox extending outwardly therefrom, the ends of said rear wall flanges remote from the pivotal mounting of said rear wall each being provided with a hole adapted to receive one of said extended pivot pins, and a flange extending along the front edge of said floor, the arrangement being such that said structure can be folded by first disengaging said latch means, then sequentially lowering said side walls about their respective hinges to lie flat superjacent said floor, then lowering said front wall to lie flat upon said side walls, then placing said grille upon said front wall with the stops inside of said front floor flange, then lowering said rear wall upon said grille and locking the same into folded position by engaging said holes with said extended pivots.

8. Structure in accordance with claim 7 where the flanges along the sides of the front wall are shallower than the flanges along the sides of the rear wall whereby said front wall can lie compactly between the floor side flanges and said rear wall flanges extend over and cover said floor side flanges in the folded unit.

* * * * *